US012600264B2

(12) United States Patent
Ozcelik et al.

(10) Patent No.: US 12,600,264 B2
(45) Date of Patent: Apr. 14, 2026

(54) THERMAL MANAGEMENT OF VEHICLE ENERGY STORAGE MEANS

(71) Applicant: JAGUAR LAND ROVER LIMITED, Whitley (GB)

(72) Inventors: Mustafa Ozcelik, Coventry (GB); Michael Farley, Bidford on Avon (GB); Christopher Blakesley, Coventry (GB); Simon Patel, Birmingham (GB); Hin Kwan Wong, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 435 days.

(21) Appl. No.: 17/925,244

(22) PCT Filed: May 14, 2021

(86) PCT No.: PCT/EP2021/062866
§ 371 (c)(1),
(2) Date: Nov. 14, 2022

(87) PCT Pub. No.: WO2021/229070
PCT Pub. Date: Nov. 18, 2021

(65) Prior Publication Data
US 2023/0226948 A1      Jul. 20, 2023

(30) Foreign Application Priority Data

May 14, 2020    (GB) ...................................... 2007133

(51) Int. Cl.
B60L 58/16           (2019.01)
B60L 58/26           (2019.01)
(Continued)

(52) U.S. Cl.
CPC ............... B60L 58/16 (2019.02); B60L 58/26 (2019.02); G05B 19/4155 (2013.01);
(Continued)

(58) Field of Classification Search
CPC .... B60L 58/16; B60L 58/26; B60L 2240/545; B60L 2240/547; B60L 2240/549;
(Continued)

(56) References Cited

U.S. PATENT DOCUMENTS

2009/0249803 A1*  10/2009  Suzuki ................ H01M 10/625
                                                                    62/157
2014/0216693 A1*   8/2014  Pekarsky ............ H01M 10/625
                                                                    165/104.31
(Continued)

FOREIGN PATENT DOCUMENTS

CA        3013651 A1    8/2017
CN      108631023 A    10/2018
(Continued)

OTHER PUBLICATIONS

Combined Search and Examination Report for application No. GB2007133.8, dated Nov. 5, 2020, 7 pages.
(Continued)

*Primary Examiner* — Charles R Kasenge
(74) *Attorney, Agent, or Firm* — Troutman Pepper Locke LLP; Dustin B. Weeks; Nicholas H. Doss

(57)                ABSTRACT

A method and control system for controlling operation of a thermal control apparatus, the thermal control apparatus configured for thermal control of an energy storage means of a vehicle, the method comprising: obtaining a parameter indicative of a state of health of the energy storage means; and controlling operation of the thermal control apparatus in dependence on a difference between the parameter and a target, wherein the target is indicative of expected state of health, and wherein a rate of change of the target varies in association with cumulative energy throughput of the energy storage means.

18 Claims, 3 Drawing Sheets

(51) Int. Cl.
| | |
|---|---|
| *G05B 19/4155* | (2006.01) |
| *H01M 10/625* | (2014.01) |
| *H01M 10/633* | (2014.01) |

(52) U.S. Cl.
CPC ....... *H01M 10/625* (2015.04); *H01M 10/633* (2015.04); *B60L 2240/545* (2013.01); *G05B 2219/50333* (2013.01)

(58) Field of Classification Search
CPC .............. B60L 2240/662; B60L 58/24; G05B 19/4155; G05B 2219/50333; H01M 10/625; H01M 10/633; H01M 10/425; H01M 10/486; H01M 2220/20; H01M 10/6568; H01M 10/6569; H01M 10/66; H01M 10/613; H01M 2010/4271; Y02E 60/10; Y02T 10/70; Y02T 10/72; Y02T 90/16; G01R 31/392; H02J 7/005
See application file for complete search history.

(56) References Cited

U.S. PATENT DOCUMENTS

| | | | |
|---|---|---|---|
| 2016/0221465 A1 | 8/2016 | Kratzer et al. | |
| 2018/0326862 A1 | 11/2018 | Woo et al. | |
| 2020/0335979 A1* | 10/2020 | Kim | ...................... H02J 7/0049 |
| 2021/0178928 A1 | 6/2021 | Ruppert et al. | |
| 2023/0094070 A1* | 3/2023 | Duan | ................. H01M 10/613 |
| | | | 701/22 |

FOREIGN PATENT DOCUMENTS

| | | |
|---|---|---|
| DE | 102009042656 A1 | 3/2011 |
| EP | 3203574 A1 | 8/2017 |
| FR | 2992101 A1 | 12/2013 |

OTHER PUBLICATIONS

International Search Report for application No. PCT/EP2021/062866, dated Aug. 19, 2021, 3 pages.

Written Opinion of the International Searching Authority for application PCT/EP2021/062866, dated Aug. 19, 2021, 8 pages.

Anonymous: "State of health - Wikipedia", Mar. 2, 2020, XP093136367, Retrieved from the Internet: URL:https://en.wikipedia.org/w/index.php?title=State_of_health&oldid=943579899 [retreived on Mar. 29, 2024], 2 pages.

European Office Action corresponding to application 21726879.6, dated Mar. 7, 2024, 10 pages.

* cited by examiner

10
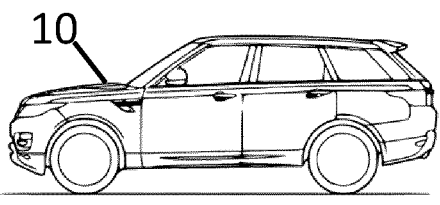
Fig 1
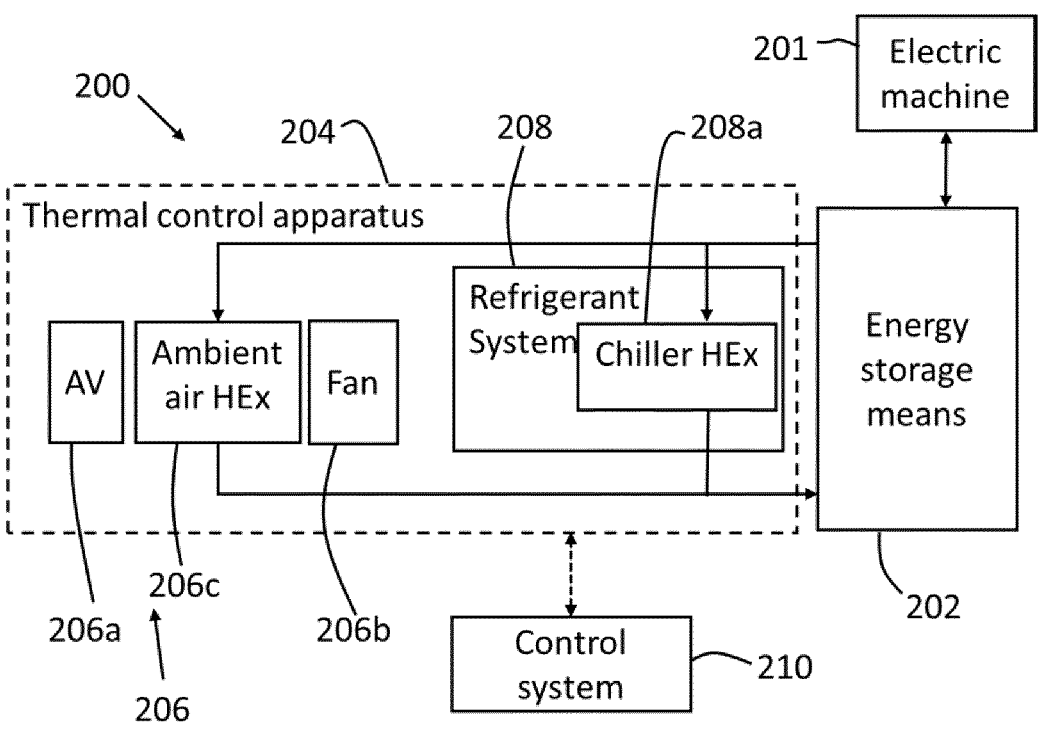
Fig 2
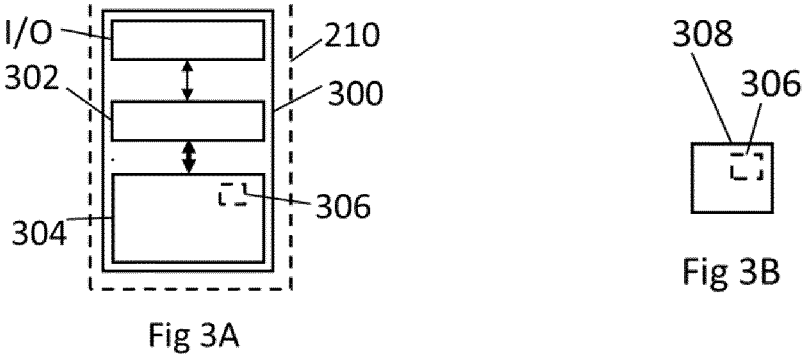
Fig 3A
Fig 3B

400

Obtain a parameter indicative of actual State of Health (SoH) of the energy storage means. — 402

Monitor the difference between the parameter and a target indicative of expected SoH. — 404

Control operation of the thermal control apparatus in dependence on the difference. — 406

THERMAL MANAGEMENT OF VEHICLE ENERGY STORAGE MEANS

TECHNICAL FIELD

The present disclosure relates to thermal management of vehicle energy storage means. In particular, but not exclusively it relates to thermal management of an energy storage means of an electric vehicle or a hybrid electric vehicle.

BACKGROUND

An electric vehicle or hybrid electric vehicle comprises an electric machine, and an energy storage means such as at least one battery or supercapacitor. The battery is configured to provide electrical power to enable the electric machine to provide torque. As batteries age, they lose their capacity to store electrical charge.

The efficiency and rate of aging of the battery is affected by the temperature of the battery. The battery temperature is dependent on the electrical power load on the battery, during charging or discharging, and is dependent on other factors such as ambient temperature. In order to keep the battery temperature within an optimum temperature range, a thermal control apparatus is provided for cooling and/or heating the battery.

The thermal control apparatus may require high electrical power while in operation. The electrical power is drawn from the battery, reducing the driving range of the vehicle. The range reduction can be in the order of tens of kilometres, for example when starting a journey on a hot or cold day such that the battery requires significant heating or cooling. Therefore, it is desirable to reduce use of the thermal control apparatus.

However, reducing use of the thermal control apparatus can increase a rate of deterioration of the battery. Deterioration is also referred to as 'aging' and 'degradation' herein. The state of aging of a battery is described using the variable 'State of Health' (SoH). A value of 100% SoH would indicate that the battery's conditions match the battery's specifications.

SUMMARY OF THE INVENTION

It is an aim of the present invention to address one or more of the disadvantages associated with the prior art.

According to an aspect of the invention, there is provided a control system for controlling operation of a thermal control apparatus, the thermal control apparatus configured for thermal control of an energy storage means of a vehicle, the control system comprising one or more controllers, the control system configured to:

obtain a parameter indicative of a state of health of the energy storage means; and control operation of the thermal control apparatus in dependence on a difference between the parameter and a target, wherein the target is indicative of expected state of health, and wherein a rate of change of the target varies in association with cumulative energy throughput of the energy storage means.

An advantage is a more efficient cooling strategy, because the target can reflect the true rate of aging of the energy storage means, as opposed to using a linear function.

In some examples, the cumulative energy throughput is determined in dependence on mileage and/or time and/or charge cycles of the energy storage means.

In some examples, the rate of change of the target is a rate of reduction of the target.

In some examples, the rate of reduction of the target decreases as cumulative energy throughput of the energy storage means increases.

In some examples, the rate of reduction of the target decreases with a convexity associated with expected cell aging of the energy storage means.

In some examples, an initial value of the target is indicative of an initial expected state of health proximal to but less than 100%.

In some examples, controlling operation of the thermal control apparatus comprises controlling a cooling performance of the energy storage means by controlling at least one energy-consuming thermal control component of the thermal control apparatus for cooling the energy storage means.

In some examples, controlling the cooling performance comprises controlling an activation threshold for activation of the energy-consuming thermal control component, wherein the activation threshold is a threshold of a temperature-related parameter, and wherein reducing the activation threshold increases the cooling performance.

In some examples, the cooling performance is dependent on a thermal operating mode of at least the energy storage means.

In some examples, the thermal operating mode is dependent on one or more of: a driving mode of the vehicle; a charging voltage; a charging current; whether the vehicle is driving or charging; whether charging is via alternating current or direct current; power demand from the energy storage means; ambient temperature; or a charging power.

In some examples, the thermal control apparatus is operable in a relatively high-power cooling state and in a relatively low-power cooling state, and wherein in the relatively high-power cooling state the energy-consuming thermal control component is operated.

In some examples, the energy-consuming thermal control component is a refrigerant system.

In some examples, in the low-power cooling state a fan is operated and/or an active vane is opened.

In some examples, controlling operation of the thermal control apparatus in dependence on the difference comprises increasing the cooling performance if the parameter is below the target.

In some examples, the parameter indicative of a state of health of the energy storage means is based, at least in part, on measurement of at least one variable, wherein the at least one variable comprises one or more of: capacity of the energy storage means; power capability of the energy storage means; internal resistance of the energy storage means; self-discharge of the energy storage means; or charge acceptance of the energy storage means.

According to an aspect of the invention, there is provided a vehicle comprising the control system and the thermal control apparatus.

According to an aspect of the invention, there is provided a method of controlling operation of a thermal control apparatus, the thermal control apparatus configured for thermal control of an energy storage means of a vehicle, the method comprising:

obtaining a parameter indicative of a state of health of the energy storage means; and controlling operation of the thermal control apparatus in dependence on a difference between the parameter and a target, wherein the target is indicative of expected state of health, and wherein a rate of change of the target varies in association with cumulative energy throughput of the energy storage means.

According to an aspect of the invention, there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a vehicle;

FIG. 2 schematically illustrates an example of a thermal control apparatus and an energy storage means;

FIG. 3A schematically illustrates an example of a control system, and FIG. 3B schematically illustrates an example of a computer-readable storage medium;

DETAILED DESCRIPTION

Figure 4:
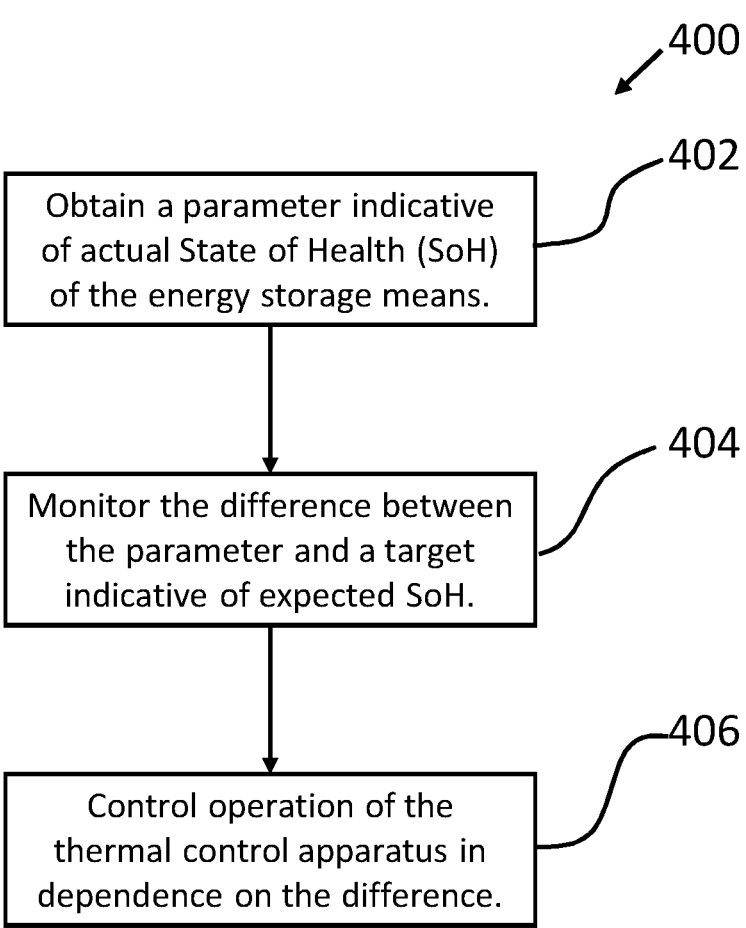
FIG. 4 illustrates an example of a method.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 is an electric vehicle or a hybrid electric vehicle.

FIG. 2 schematically illustrates a system 200 for the electric vehicle or hybrid electric vehicle. The system comprises an energy storage means 202, an electric machine 201, a thermal control apparatus 204 for thermal control of the energy storage means 202, and a control system 210 configured to control the thermal control apparatus 204.

The electric machine 201 may be configured as an electric traction motor or as a starter-generator. An electric traction motor is configured to draw electrical power from the energy storage means 202, typically at hundreds of volts, to provide tractive torque for accelerating the vehicle 10. If the electric traction motor is operable as a generator, the electric traction motor may be capable of converting kinetic energy of the vehicle 10 to electrical power for charging the energy storage means 202. A starter-generator requires less power and lower voltage, and is configured to provide functions such as starting an internal combustion engine, and operating as a generator, but not providing tractive torque.

The electric machine 201 may be implemented as an alternating current induction motor or as a permanent magnet motor, or as another type of motor.

The energy storage means 202 is typically a battery and will be referred to as a battery herein. However, it would be appreciated that the energy storage means 202 could comprise any other means for storing energy for a torque source such as the electric machine 201, that would benefit from the control strategy described herein.

The battery 202 typically comprises a plurality of cells. During charging and discharging of the battery 202, the cells heat up, and the heat must be dissipated in order to keep the battery 202 within its optimum temperature range for efficiency and durability.

The thermal control apparatus 204 may comprise a coolant circuit configured to pump a heat conducting fluid, such as liquid coolant (e.g. glycol), through fluid channels (not shown) in the battery 202. The fluid channels are configured to enable heat to dissipate from the battery cells to the coolant. The coolant emerges from the battery 202 carrying excess heat. The heat is removed using at least one heat exchanger.

In FIG. 2, the thermal control apparatus 204 comprises two cooling circuits each comprising a heat exchanger. The cooling circuits may comprise an ambient air cooler 206, a refrigerant system 208, electric coolant pumps and flow control valves (not shown). The refrigerant system 208 is also referred to herein as a 'refrigerant-based chiller' or just 'chiller'. The ambient air cooler 206 may comprise an ambient air heat exchanger (HEx) 206c configured to transfer the heat to ambient airflow. The refrigerant-based chiller 208 may comprise a chiller heat exchanger 208a configured to transfer the heat from the coolant to a refrigerant fluid.

The ambient air cooler 206 may comprise a fan 206b, and/or active vane(s) 206a (AV) also known as active grille shutters, to increase cooling airflow to the ambient air heat exchanger 206c. The fan 206b is configured to blow or suck air through the ambient air heat exchanger 206c. The active vanes 206a may have an at least one open position, and a closed position. The active vanes 206a may be opened to a fully open position or to a range of partially opened positions. When the active vanes 206a are in the open position, an opening in the vehicle body is exposed to ambient air, which is directed towards the ambient air heat exchanger 206c as the vehicle moves. The active vanes 206a may be located on a forward-facing surface of the vehicle 10. The active vent 206a may be located behind a grille or located behind a duct formed in the body of the vehicle 10, for example. When the active vent 206a is in the closed position, airflow to the ambient air heat exchanger 206c is reduced.

The refrigerant system 208 may comprise a refrigerant loop (not shown) comprising refrigerant. The refrigerant loop may comprise a compressor, a condenser, expansion and flow control valves, a fan-assisted evaporator, and the above-mentioned chiller heat exchanger 208a for receiving heat from the coolant. The expansion and flow control valves can advantageously reduce or stop flow through the chiller and/or reduce electrical energy or work done by the compressor.

The compressor, fans and coolant pumps as described above are also referred to herein as energy-consuming thermal control components, because they are active and require continuous energy to operate.

Further, the thermal control apparatus 204 may comprise heating apparatus (not shown).

Referring now to the control system 210, the control system 210 may be configured to control the thermal control apparatus 204 in a plurality of cooling states.

In a no-cooling state, the active vanes 206a are in the closed position, the ambient air fan 206b is not operated, and the refrigerant system 208 is not operated. A valve of known type may close off the refrigerant system 208.

In a passive cooling state, the active vanes 206a are in the open position, the ambient air fan 206b is not operated, and the refrigerant system 208 is not operated.

In a low-power active cooling state, the active vanes 206a are in the open position and the ambient air fan 206b is operated. The refrigerant system 208 is not operated. This is an active cooling state because the ambient air fan 206b is operated continuously.

In a high-power active cooling state, the refrigerant system 208 is operated, for example by running the compressor as well as coolant pumps. Optionally the compressor is run at a higher speed and coolant pumps produce a greater coolant flow. Optionally, the active vanes 206a may be in the open position and/or the ambient air fan 206b may be operated.

The refrigerant system 208 has a greater heat capacity and rate of cooling than the ambient air-based cooling states, so is more effective. However, overall energy consumption is higher which reduces vehicle range before the next battery charge. By contrast, selecting a lower-power cooling state than required may increase battery aging, which permanently reduces vehicle range. Therefore, cooling performance should be optimised carefully, by the control system 210.

Examples of control schemes for controlling cooling performance are described below.

In an example, the refrigerant system 208 may be activated in dependence on an activation threshold. Activation may comprise operating the compressor, the expansion and flow control valves, and increasing the coolant pump duty. This chiller activation threshold may depend on a temperature-related parameter, associated with required and/or monitored battery temperature. For example, the activation threshold may correspond to a particular battery temperature setpoint, and there may be a corresponding different deactivation threshold. The values of the activation and deactivation thresholds, also known as setpoints, are design parameters which are made to keep the battery temperature within a target range, wherein the control system is configured to control the cooling performance to stabilise the battery temperature within the target range. The setpoints may be varied depending on additional factors such as the health (aging) of the battery, state of the vehicle, and/or state of the ambient temperature, to optimise for operation efficiency and durability. If the value of the battery temperature is higher than the 'chiller activation' threshold, then the refrigerant system 208 needs to be activated in order to decrease the battery temperature, and continue to operate until the 'chiller deactivation' threshold is reached.

In an example implementation, the chiller activation threshold may correspond to a specific temperature within the range 30 Celsius to 45 Celsius.

As described earlier, the choice of control strategy affects both vehicle range and the rate of degradation of SoH, depending on whether the battery 202 is over-cooled or under-cooled. The following method 400 of FIG. 4 enables the control system 210 to optimise both energy consumption and SoH for the whole lifespan of the battery 202. The method 400 comprises:

at block 402, obtaining a parameter indicative of the SoH of the battery 202; and at blocks 404 and 406, controlling operation of the thermal control apparatus 204 in dependence on a difference between the parameter and a target, wherein the target is a target SoH indicative of expected SoH, and wherein a rate of change of the target SoH varies in association with cumulative energy throughput (e.g. age/distance/charge cycles) of the battery 202.

Figure 5:
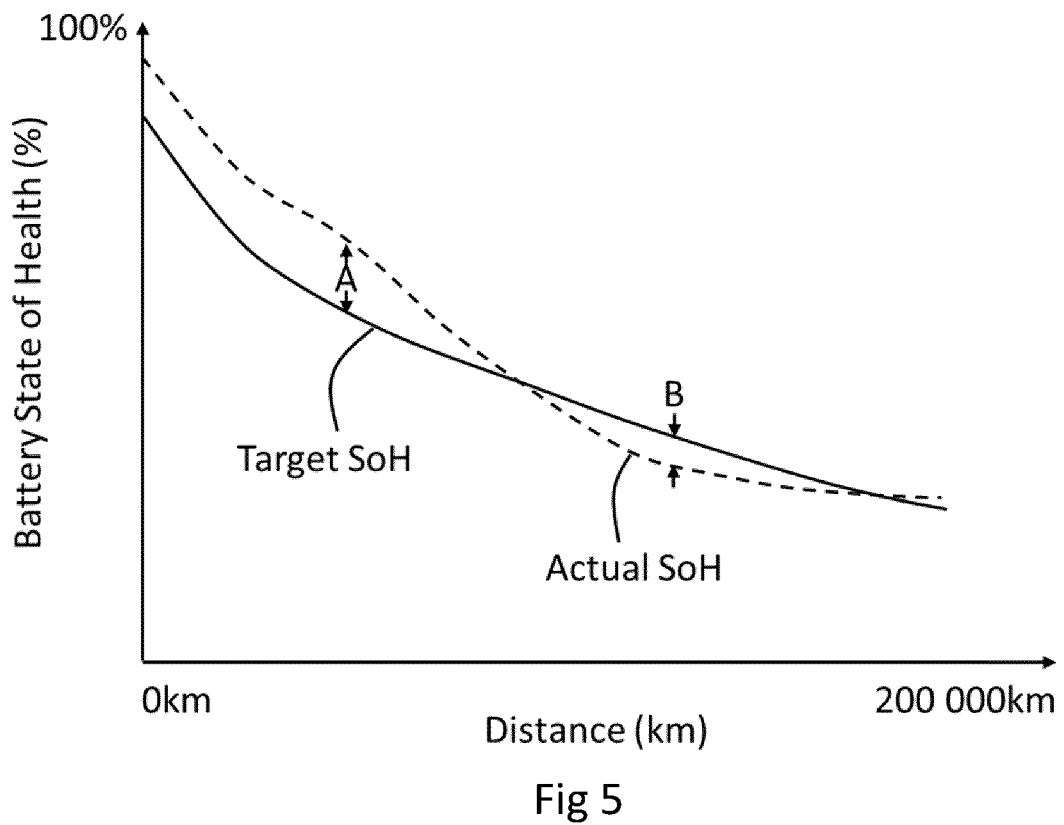
FIG. 5 is an example graph illustrating target SoH and actual SoH of the battery, with respect to distance travelled.

This method 400 enables cooling performance to be reduced when actual SoH is better than expected (above-target), for reduced energy consumption, and enables cooling performance to be increased when actual SoH is worse than expected (below-target), for increased durability and reduced range degradation. Further, the target SoH does not decrease linearly, and instead has a variable rate of change as shown in FIG. 5 and described later.

The first block 402 comprises obtaining the parameter indicative of SoH, referred to below as an SoH parameter. A value of 100% of the SoH parameter would indicate that the battery's conditions match the battery's specifications. In practice, the SoH parameter will steadily decrease over the lifespan of the battery 202, due to aging.

In some examples, the SoH parameter may be evaluated by a battery management system (BMS), or some form of off-vehicle cloud-based/server-based estimation algorithm, and reported to the control system 210, or the control system 210 may perform the function of the BMS.

The SoH parameter indicates the actual, current SoH of the battery 202. Therefore, the SoH parameter is based at least partially on measurement of at least one variable. In an implementation, the variable may comprise battery capacity. Battery capacity indicates the electric charge throughput that can be delivered for some amount of time (e.g. Amp-hr or kWh). Battery capacity is a useful health indicator. Battery capacity can be estimated during charging or discharging of the battery 202, by comparing the charge transferred in a time period, relative to the expectation for a new battery 202.

A further example of the variable is battery internal resistance. If measured resistance across the battery cells increases, a reduction of SoH may be determined. The measured resistance may be a measure of direct current internal resistance (DCIR).

Another example of the variable is battery power capability. The power capability is limited by the electrical current that can be instantaneously drawn without going over or under voltage limits. Capacity and power capability are related to each other and to battery impedance, so falling capacity and capability both indicate whether more current is required to draw the same power, due to battery degradation.

Further examples of the at least one variable comprise: battery self-discharge; battery charge acceptance; or any other usable variables.

Then, at block 404, the method 400 comprises monitoring the difference (delta-SoH) between the SoH parameter (actual SoH) and a target SoH. The target SoH is indicative of the expected SoH of the battery 202. When the actual SoH is greater than the target SoH, the battery 202 is aging better than expected. Therefore, cooling performance can be reduced which enables increased range. However, when the actual SoH is below the target SoH, the battery 202 is aging worse than expected. Therefore, cooling performance can be increased, to slow down rate of aging and allow the actual SoH future trajectory to move towards the target SoH trajectory and increase battery lifespan.

FIG. 5 plots the actual SoH (SoH parameter) using a dashed line, and the target SoH using a solid line. The y-axis is SoH (%) and the x-axis is distance (km) or any other indicator related to cumulative energy throughput of the battery 202.

The target SoH is dependent on a predetermined function. As illustrated, the target SoH decreases during the lifetime of the battery 202, due to expected aging. Aging of battery cells is understood to arise from two mechanisms: 1) active use 2) passive chemical degradation. Therefore, the target SoH is a function dependent on some measure(s) of active use, e.g. cumulative energy throughput, and the passive degradation, e.g. age of the battery. Cumulative energy throughput may be measured directly, or estimated from other variables such as distance driven by the vehicle since new (mileage), or number of charge events, or other methods. For example, the target SoH may be dependent on both distance driven and total time of operation of the battery 202 (battery age since new). Decrease of the target SoH may be dominated by battery age (time) if the vehicle is not driven, and may be dominated by distance if the vehicle covers a high mileage while still new. The control system may comprise two different target SoH functions, one corresponding to FIG. 5 (distance) and the other corresponding to battery age. Whichever comes first, distance or age, will dictate the target SoH function used by the control system. The distance-related target SoH function may cover distances of up to 100 000 km or more. The age-related target SoH function may cover years, such as five years or longer.

The measure of cumulative energy throughput is not reset between journeys or charge-cycles, and runs continuously over the lifespan of the battery 202 representing a battery-total.

As described above, the above target SoH used in the method 400 may be based on distance and/or age. Alternatively, the target SoH may instead be based on another measure of cumulative energy throughput such as the total number of charge-discharge cycles.

The distance, age and charge cycles of the battery 202 may differ from the distance, age and charge cycles of the vehicle 10, because the battery 202 may not be the original battery of the vehicle 10. Therefore, the measure of cumulative energy throughput may be linked to the battery 202 rather than the vehicle 10.

To simplify the following description, the cumulative energy throughput will be referred to as distance (mileage). The x-axis of FIG. 5 is in the units of distance, but could be any indicator of cumulative energy throughput of the battery 202.

The illustrated target SoH will now be described in more detail. Its initial value at zero-distance is proximal to but less than 100%, for example around 97% or some other value from 95% to 99%. This offset is due to the inherent inaccuracy of SoH prediction as well as the time offset between production and end-user delivery, during which battery aging occurs naturally. This prevents premature activation of an aggressive thermal control strategy.

The target SoH then decreases nonlinearly with increasing cumulative energy throughput (e.g. mileage, battery age, charge throughput). The rate of reduction of the target SoH decreases as the mileage increases, and eventually tends towards a low negative gradient or a fixed value of SoH. This is advantageous compared with a linear function. A linear function would not reflect the true rate of battery aging, which is typically faster during early life and slower during later life.

The illustrated target SoH enables reduced cooling (increased range) during the early life of the battery 202, compared with a linear function. This is because a faster initial rate of aging is accounted for. Then, the illustrated target SoH enables increased cooling (preservation of range) during the later life of the battery 202. This is because a slower rate of aging is accounted for. Making the target SoH nonlinear as illustrated, rather than linear, enables an increased range of the vehicle 10 over the whole life-span of the battery 202.

The specific shape of the illustrated target SoH can be provided using any suitable function that comprises a convex downward shape. A convex downward function is also referred to as a 'concave up, decreasing' function. The convexity could be created using a smooth continuous function, or as an elbow between two linear functions, or as a curve in a ramped/staircase function, for example.

As illustrated, the target SoH may be configured to remain above a predetermined SoH value for at least the first 160 000 kilometres, and/or the first eight years, for example. The predetermined SoH value depends on implementation. If the target SoH were a straight line based on its initial gradient, this performance would not be achieved.

At the next block 406, the method 400 controls operation of the thermal control apparatus 204 in dependence on the difference determined at block 404. As described above, cooling performance may be increased when the actual SoH is below target. In an example, the cooling performance may be increased by reducing the activation threshold such as the chiller activation threshold. The chiller deactivation threshold, if provided, may also be reduced in dependence on the difference.

Figure 6:
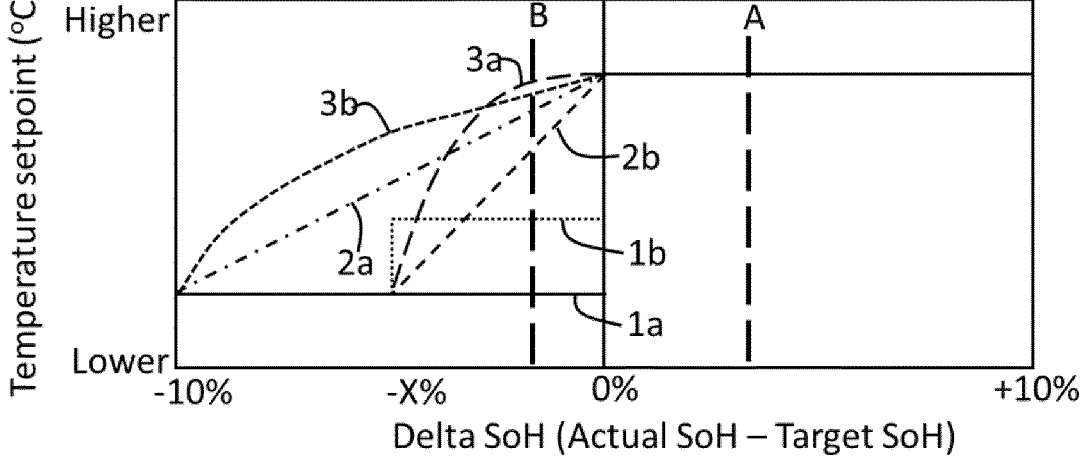
FIG. 6 is an example graph illustrating different functions between a battery temperature setpoint and delta-SoH (actual SoH-target SoH).

FIG. 6 is a graph illustrating various ways in which the cooling performance may be modified in dependence on the delta-SoH determined in block 404. The y-axis plots the battery temperature setpoint, which in this example corresponds to the chiller activation threshold and would look similar applied to the chiller deactivation threshold. The x-axis plots the delta-SoH. The battery temperature setpoint is a function of delta-SoH.

The x-axis value annotated 'A' corresponds to a first delta-SoH 'A' of FIG. 5 in which the actual SoH is above the target SoH. The x-axis value annotated 'B' corresponds to a second delta-SoH 'B' of FIG. 5 in which the actual SoH is below the target SoH.

The illustrated functions 1*a*, 1*b*, 2*a*, 2*b*, 3*a*, 3*b* correspond to different relationships between the battery temperature setpoint and the delta-SoH, described below. The control system 210 may implement at least one of these functions.

When delta-SoH is zero or positive, the SoH is above-target. When on-target, the battery temperature setpoint is illustrated as having a first fixed value, which may be below approximately 45 Celsius. In other examples, the value is variable rather than fixed. The value depends on implementation, and may be within the range above approximately 35 Celsius but below 45 Celsius during driving of the vehicle 10. The value is such that the refrigerant system 208 is not required, for maintaining the battery temperature setpoint.

When delta-SoH is negative, the SoH is below target. When below-target, the battery temperature setpoint is illustrated as having either a fixed value (function 1a), or a variable value (functions 1b, 2a, 2b, 3a, 3b), wherein the minimum or fixed value may be below approximately 35 Celsius in FIG. 6. The value depends on implementation, and may be within the range below 35 Celsius and above 25 Celsius during driving of the vehicle 10.

In more detail, function 1a corresponds to a binary selection between two battery temperature setpoints, according to the sign of delta-SoH. The selection changes when delta-SoH crosses zero. In FIG. 6, the battery temperature setpoint switches when delta-SoH becomes negative, therefore requiring more cooling immediately. Function 1a is useful if the target SoH is treated as a lower limit of acceptable SoH, because any deviation below delta-SoH=0% will cause an immediate step-increase in cooling.

The other functions 1b, 2a, 2b, 3a, 3b vary the battery temperature setpoints (activation threshold, or both activation and deactivation thresholds) in dependence on the size of the negative delta-SoH. This enables the cooling to increase in proportion to the increasing negative delta-SoH. These functions are useful if some limited deviation below the target SoH can be tolerated.

Function 1b corresponds to a selection between three battery temperature setpoint values, e.g. for the activation threshold. The first setpoint is selected when delta-SoH is positive. The second setpoint is selected when delta-SoH is negative and within a first range. The third setpoint is a lower temperature than the second setpoint, and is selected when delta-SoH is negative and within a second range. The second range is below the first range. In other words, the first range is from 0% to –X % delta-SoH, and the second range is for negative values greater than –X %. In FIG. 6, the boundary X depends on implementation, e.g. a value within the range less than 0% to –10%.

Functions 2b and 3a are similar to function 1b, but are variables within the first range of delta-SoH, rather than fixed values. Function 2b is a linear interpolation between the first setpoint and the third setpoint. Function 3a is a nonlinear (curved) function, in this case having a concave down shape as negative delta-SoH increases. Function 3a may be described by a polynomial function, for example. Function 3a has a low negative gradient at delta-SoH close to zero, and the negative gradient increases as negative delta-SoH increases.

Functions 2b and 3a are constrained to the first range. Therefore, when delta-SoH is below-X %, the third setpoint is used as a fixed value. By contrast, functions 2a (linear) and 3b (polynomial) are equivalent functions that are not constrained to the first range.

An advantage of the interpolated and polynomial shapes is avoiding a potentially-perceptible step-change in the operating point of the thermal control apparatus 204, as seen in functions 1a and 1b. A step change would be perceived as inconsistent range estimates displayed to the driver on different days.

A further advantage of the interpolated and polynomial shapes is that efficiency is improved, as indicated by the different areas under the curves of each of the functions. A greater area under the curve indicates that the battery temperature setpoint remains higher for longer, requiring less overall cooling. Function 3a has a greater area under the curve than function 2b. Function 3b has a greater area under the curve than function 2a. Therefore, the polynomial functions 3a, 3b are more efficient than the linear interpolation functions 2a, 2b, which are in turn more efficient than the selection functions 1a, 1b.

The constrained concave down function 3a provides an optimal balance of efficiency and aging. Efficiency is prioritised for low values of negative delta-SoH, where battery temperature setpoint remains higher than the other functions. Slow aging is prioritised for higher values of negative delta-SoH, because the battery temperature setpoint reduces increasingly quickly as negative delta-SoH increases. Therefore, cooling is initially low, but increases rapidly when needed.

In some, but not necessarily all examples, the function relating the battery temperature setpoint to delta-SoH (e.g. function 3a) may be transformed to different temperature ranges, depending on a context of the vehicle 10. For example, the selected function from FIG. 6 represents a temperature range for vehicle driving, however the temperature range and/or shape of the function could be different for other contexts such as vehicle charging. A control map may be defined based on FIG. 6, for different contexts.

In some examples, the context may be indicated by a thermal operating mode of at least the battery 202, or the whole vehicle 10. The control system 210 may be configured to implement a plurality of thermal operating modes, e.g. cold operation, sports mode, eco mode, etc. Each thermal operating mode defines a different relationship between the battery temperature setpoint and delta-SoH. For example, in eco mode, the temperature setpoint at which cooling is activated may fall at a lower rate than in a non-eco mode, to reduce cooling demand. The selection of a thermal operating mode depends on a context of the vehicle 10, and the selection may be automatic or manual. The thermal operating modes may be selected in dependence on one or more of the following:

Whether the vehicle 10 is driving or charging. For example, a higher battery temperature setpoint for a given delta-SoH may be used during charging. For example, the battery temperature setpoint may be at least 5 Celsius more, for a given setpoint, during charging than during discharging.

Charging context. Examples of detecting the charging context include detecting the charging waveform (alternating or direct current), the charging voltage (grid-voltage home charger or high-voltage commercial charger), or charging power. The charging context affects the level of cooling required.

Discharge (driving) context. Examples of detecting the driving context include detecting the power demand from the battery 202, a driving mode of the vehicle 10, or a vehicle power mode (storage, preconditioning, or driving). Driving modes are defined below.

Ambient temperature. This may be used to determine whether to open the active vanes 206a and/or the ambient air fan 206b, rather than operating the chiller.

A driving mode is defined as follows. The vehicle may be operable in a plurality of selectable driving modes. Examples include an 'economy' or 'eco' mode, a 'comfort' mode, and a 'dynamic' mode. (The dynamic mode may also be referred to as a 'sports' or 'performance' driving mode). Each driving mode may configure a plurality of vehicle settings. For example, the dynamic mode may modify a throttle map to increase throttle response, and/or modify a braking map to increase braking response, relative to comfort or eco modes. The dynamic mode may prioritise vehicle acceleration over maintaining a set cabin temperature, relative to comfort or eco modes. The vehicle mode may be selected via a selector dial or other interface. The interface may further enable selection of an 'automatic' mode which automatically selects the driving mode based on driving style and/or terrain. Regarding the present battery cooling method, the dynamic mode may require a relatively-lower battery temperature setpoint for a given delta-SoH, relative to other driving modes. This keeps the battery in good condition and reduces temperature spikes. The eco mode may require a relatively-higher battery temperature setpoint for the given delta-SoH, to reduce operation of the refrigerant system 208 and save energy.

FIG. 3A illustrates how the control system 210 may be implemented. The control system 210 of FIG. 3A illustrates a controller 300. In other examples, the control system 210 may comprise a plurality of controllers on-board and/or off-board the vehicle 10.

The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components.

In some examples, the control system may be configured to receive over-the-air software updates to modify the target SoH and/or the function(s) relating the battery temperature setpoint to delta-SoH.

FIG. 3B illustrates a non-transitory computer-readable storage medium 308 comprising the instructions 306 (computer software).

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. The invention could be applied to heating scenarios, not just cooling scenarios.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling operation of a thermal control apparatus, the thermal control apparatus configured for thermal control of an energy storage means of a vehicle, the control system comprising one or more controllers, the control system configured to:

obtain a parameter indicative of a state of health of the energy storage means;

select a variable value temperature setpoint function in dependence on a difference between the parameter and a target, the variable value temperature setpoint function selected from the group consisting of: a triple setpoint, a linear interpolation, a nonlinear interpolation, and a polynomial function; and control operation of the thermal control apparatus in accordance with the variable value temperature setpoint function, wherein the target is indicative of expected state of health, wherein a rate of change of the target varies in association with cumulative energy throughput of the energy storage means, wherein the rate of change of the target is a rate of reduction of the target, and wherein the rate of reduction of the target decreases as cumulative energy throughput of the energy storage means increases.

2. The control system of claim 1, wherein the cumulative energy throughput is determined in dependence on mileage and/or time and/or charge cycles of the energy storage means.

3. The control system of claim 1, wherein the rate of reduction of the target decreases with a convexity associated with expected cell aging of the energy storage means.

4. The control system claim 1, wherein an initial value of the target is indicative of an initial expected state of health proximal to but less than 100%.

5. The control system of claim 1, wherein controlling operation of the thermal control apparatus comprises controlling a cooling performance of the energy storage means by controlling at least one energy-consuming thermal control component of the thermal control apparatus for cooling the energy storage means.

6. The control system of claim 5, wherein controlling the cooling performance comprises controlling an activation threshold for activation of the energy-consuming thermal control component, wherein the activation threshold is a threshold of a temperature-related parameter, and wherein reducing the activation threshold increases the cooling performance.

7. The control system of claim 5, wherein the cooling performance is dependent on a thermal operating mode of at least the energy storage means.

8. The control system of claim 7, wherein the thermal operating mode is dependent on one or more of: a driving mode of the vehicle; a charging voltage; a charging current; whether the vehicle is driving or charging; whether charging is via alternating current or direct current; power demand from the energy storage means; ambient temperature; or a charging power.

9. The control system of claim 5, wherein the thermal control apparatus is operable in a relatively high-power cooling state and in a relatively low-power cooling state, and wherein in the relatively high-power cooling state the energy-consuming thermal control component is operated.

10. The control system of claim 9, wherein the energy-consuming thermal control component is a refrigerant system.

11. The control system of claim 9, wherein in the low-power cooling state a fan is operated and/or an active vane is opened.

12. The control system of claim 5, wherein controlling operation of the thermal control apparatus in dependence on the difference comprises increasing the cooling performance if the parameter is below the target.

13. The control system of claim 1, wherein the parameter indicative of a state of health of the energy storage means is based, at least in part, on measurement of at least one variable, wherein the at least one variable comprises one or more of: capacity of the energy storage means; power capability of the energy storage means; internal resistance of the energy storage means; self-discharge of the energy storage means; or charge acceptance of the energy storage means.

14. A vehicle comprising the control system and the thermal control apparatus of claim 1.

15. The control system of claim 1, wherein an initial value of the target is indicative of an initial expected state of health proximal to but less than 100%.

16. A method of controlling operation of a thermal control apparatus, the thermal control apparatus configured for thermal control of an energy storage means of a vehicle, the method comprising:

obtaining a parameter indicative of a state of health of the energy storage means;

selecting a variable value temperature setpoint function in dependence on a difference between the parameter and a target, the variable value temperature setpoint function selected from the group consisting of: a triple setpoint, a linear interpolation, a nonlinear interpolation, and a polynomial function; and controlling operation of the thermal control apparatus in accordance with the variable value temperature setpoint function, wherein the target is indicative of expected state of health, wherein a rate of change of the target varies in association with cumulative energy throughput of the energy storage means, wherein the rate of change of the target is a rate of reduction of the target, and wherein the rate of reduction of the target decreases as cumulative energy throughput of the energy storage means increases.

17. A non-transitory, computer readable medium having stored thereon computer software that, when executed, is arranged to perform the method according to claim 16.

18. The method of claim 16, wherein an initial value of the target is indicative of an initial expected state of health proximal to but less than 100%.

\* \* \* \* \*